INVENTORS
WILLIAM J. FRY
FRANCIS J. FRY
BY
ATTORNEYS

Jan. 16, 1968 W. J. FRY ET AL 3,364,352
APPARATUS FOR LOCATING ANATOMIC SITES IN BRAINS
OF ANIMALS BY RADIOGRAPHY INCLUDING MEANS
FOR HOLDING THE ANIMALS' HEAD
Filed Feb. 18, 1964 3 Sheets-Sheet 3
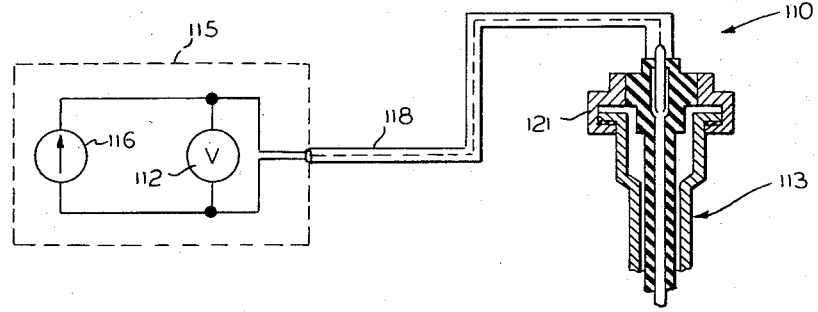
FIG. 5
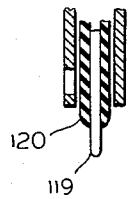
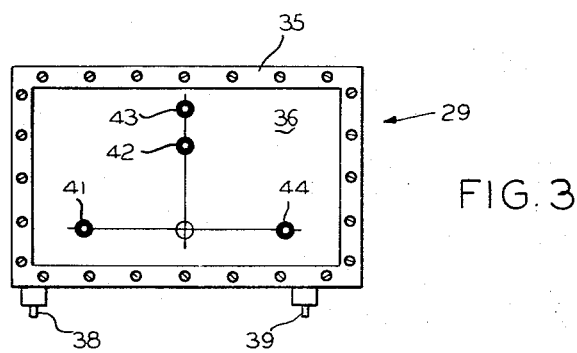
FIG. 3
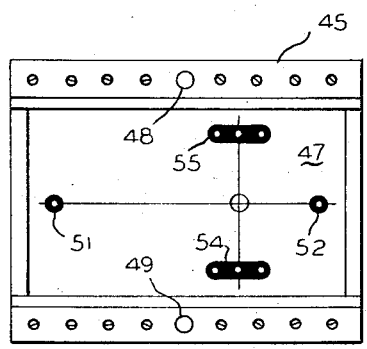
FIG. 4
INVENTORS
WILLIAM J. FRY
FRANCIS J. FRY
BY
ATTORNEYS

United States Patent Office 3,364,352
Patented Jan. 16, 1968

3,364,352
APPARATUS FOR LOCATING ANATOMIC SITES IN BRAINS OF ANIMALS BY RADIOGRAPHY INCLUDING MEANS FOR HOLDING THE ANIMALS' HEADS
William J. Fry, Champaign, and Francis J. Fry, Urbana, Ill., assignors to Altair Corporation, Champaign, Ill., a corporation of Illinois
Filed Feb. 18, 1964, Ser. No. 345,714
10 Claims. (Cl. 250—50)

This invention relates generally to a system for locating anatomic sites in the brain of animals, and is more particularly related to a device which will locate a desired anatomic site with a greater degree of accuracy than heretofore obtainable, and which also provides a positioning means to accurately place a cannula or electrode into the brain.

Although applicable to location of sites in brains of larger animals including humans, the system of this invention was particularly designed for use in conjunction with smaller animals such as cats and monkeys.

As the demand for more sophistication in anatomical and functional studies of the brain develops, greater precision in locating specific predetermined sites in the brain is required. At present, a critical need exists in experimental animal studies for increased precision in the production of lesions or for electrode placements into specific anatomic structures without appreciable damage to, or misplacement in other structures.

With respect to lesion production, this need is particularly apparent when the ultrasonic method for producing selective changes in brain structures is employed. In this case, the versatility, usefulness, and potential of ultrasonic lesion production has been severely limited by a method generally utilized by investigators up to the present time. In that method, the position of a specific deep anatomic site in the brain is estimated from a reference plane determined by an axis through the center of the external auditor meatuses and the lowermost aspects of the infraorbital ridges, first used by Reid in the year 1884, and designated Reid's plane. A coordinate system using Reid's plane has served as a basis for a tremendous amount of stereotactic work on experimental animals and obviously its conception and use did constitute a development which provided the basis for significant advances in knowledge of the structure and function of the brain.

However, the present inadequacy of the coordinate system using Reid's plane is readily apparent and can be illustrated here by a single specific example. In particular it has been found in laboratory tests that it is completely impractical, using the above mentioned coordinate system in conjunction with brain atlases, to accomplish bilateral interruption of the mammillothalamic tract with no appreciable spreading of the lesions into the surrounding structure, in a reasonable percentage of cats.

It is therefore an object of this invention to provide a locating and positioning means for producing lesions in specific anatomic sites of the brain such as the mammillothalamic tract.

According to an important feature of this invention, vertical and lateral roentgenograms are obtained from corresponding cassettes which have coordinate axes locating means thereon.

Another important feature of this invention is the use of a positioner which has a plurality of axes which are parallel to the axes of cooperating cassettes.

A further feature of the invention is in means for integrating X-ray apparatus into the system in a manner to obtain a high degree of accuracy.

Still another feature of the invention is in the provision of means for supporting and accurately locating probe means, which may be in the form of electrodes or external ultrasonic means for producing lesions, or may be in the form of a cannula.

This invention contemplates other objects, features and advantages which will become more fully apparent from the following detailed description taken in conjunction with the accompanying drawings which illustrates the preferred embodiment and in which:

FIGURE 3 is a plane view of a lateral cassette which is constructed in accordance with the principles of this invention and is used in FIGURE 1;

FIGURE 4 is a plane view of a vertical cassette which is constructed in accordance with the principles of this invention and is also used in FIGURE 1; and FIGURE 5 shows a section view of a cannula, which may be used with this invention, and is connected to an indicating device.

Figure 1:
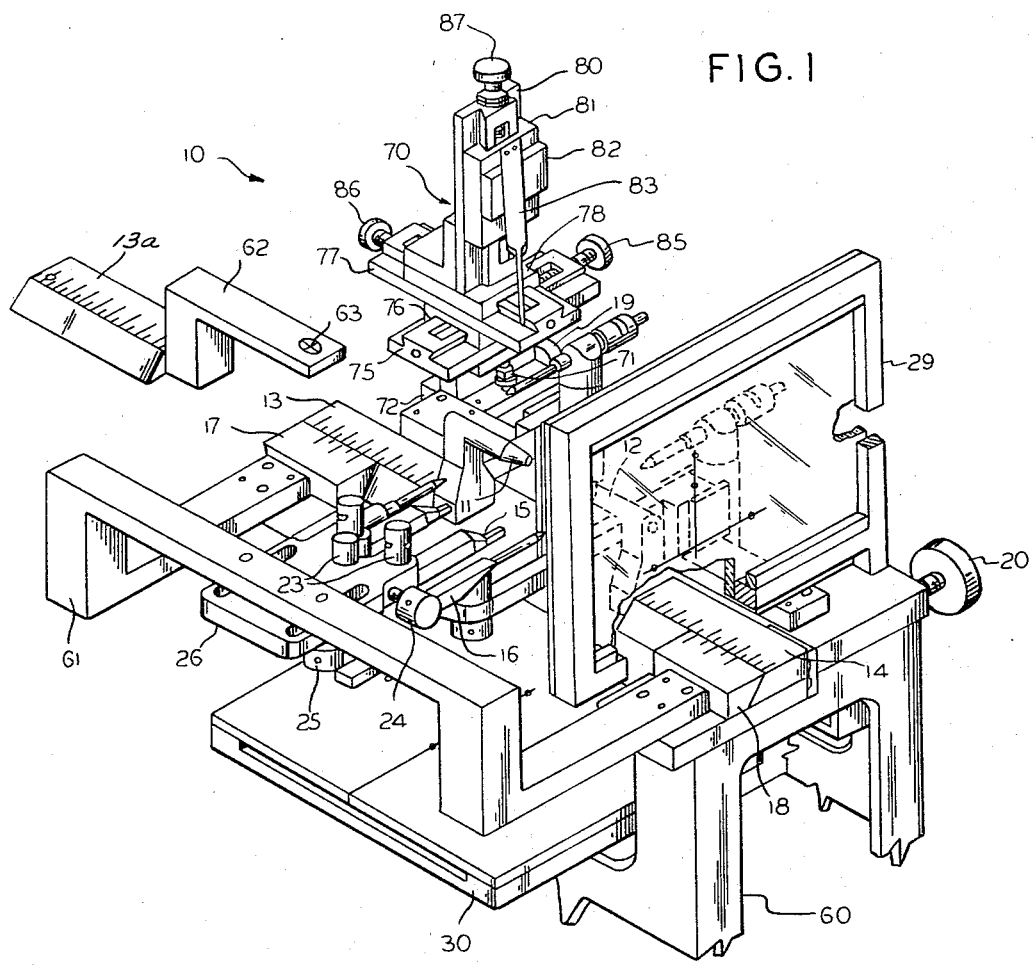
FIGURE 1 is an isometric view of a head holder and positioner which is constructed in accordance with the principles of this invention, and also shows in a demounted position a benchmark fixture used for alignment purposes.

In FIGURE 1 reference numeral 10 generally designates a head holder which comprises a pair of geometrically opposed ear bars 11 and 12 which cooperate with a set of skull and mouth clamp 15 and 16 respectively to securely hold the heads of animals such as cats and monkeys. The ear bars 11 and 12 are supported from slides 13 and 14 which are adjustably slidable transversely to the desired positions and are then locked in place against a pair of wedge blocks 17 and 18 by operating hand screws 19 and 20, respectively. The skull and mouth clamps, which have horizontal and vertical motion, are provided with locking screws 23, 24 and 25 located on a clamp support 26. A lateral projection cassette 29 and a vertical projection cassette 30 support markers defining coordinate axes as hereinafter described, and are mounted on the head holder 10 to provide support means for films for producing lateral and vertical roentgenograms, one film being supported in a vertical plane for a lateral roentgenogram taken laterally through the brain, and the other film being supported in a horizontal plane by a vertical roentgenogram taken vertically through the brain.

When an exact anatomic site in the brain of an animal is to be located, the animal, under general anesthesia, is placed with its head in the head holder 10 and the head is secured in place by the ear bars 11 and 12 and clamps 15 and 16. X-ray film is placed into the cassettes 29 and 30 which will produce lateral and vertical roentgenograms from a pair of corresponding X-ray tubes (not shown). Images of the coordinate axes defining markers on the cassettes 29 and 30 will then be imposed onto the lateral and vertical roentgenograms of the animal's head wherefrom exact measurements from the coordinate axes to the anatomic site desired can be obtained.

The construction of the lateral cassette 29 is shown in FIGURE 3, and has a frame assembly 35 wherein a 3/16 inch thick Lucite plate 36 is mounted. A pair of locating pins 38 and 39 are secured to the frame assembly 35 and assure that a reset accuracy, of the cassette 29 into the head holder 10, of ±0.001 inch will be maintained. It is essential that this degree of accuracy be provided since the cassettes not only hold the X-ray film but also support a plurality of lead markers 41, 42, 43, and 44. These markers produce images on the film, and reference lines may be inscribed on the developed film, through the centers of the images.

The construction of the vertical cassette 30 is shown in FIGURE 4, and has a frame assembly 45 wherein a 3/16 inch thick Lucite plate 47 is mounted. A pair of locating pins 48 and 49 are secured to the frame assembly 45, which will provide a reset accuracy, of the cassette 30 into the head holder 10, of ±0.001 inch. A pair of round lead markers 51 and 52 and a pair of oblong lead markers 54 and 55 are accurately located on the Lucite plate 47, and are used for measurement references of the roentgenogram after it is developed.

The production of lesions or placement of electrodes for stimulation or recording can proceed immediately after the completion of the ventriculographic procedure, described hereinafter, which provide the landmark information underlying the determination of the coordinates of chosen brain sites. Therefore the animal need not be removed from the apparatus after ventriculography and before instituting subsequent procedures.

However, in some cases it is desirable or necessary to interpose an extended time interval between ventriculography and stereotactic procedures to follow. This is within the situation when multiple procedures are planned and it is currently the method followed when ultrasonic lesion arrays are placed in the brain. In such cases, where brain modifications or electrode placement follows centriculography after a period of time, it is not necessary to duplicate precisely the position of the animal's head in the head holder 10. This is a consequence of the fact that the landmark information evident on the roentgenogram at the time of ventriculography can be transferred to skull roentgenograms taken any time the animal's head is repositioned in the head holder 10. This is accomplished by superimposing corresponding roentgenograms and aligning the skull images, and then marking the useful information on the skull roentgenogram taken at the time of the planned stereotactic procedure. Since the angular orientation of the head of the animal in the head holder 10, about the longitudinal axis, can be accurately duplicated from one procedure to another, no uncertainty in the coordinate determination of anatomic sites need be introduced at this stage, other than that inherent in the superposition and information transferring procedure.

The landmarks which serve as a basis for computing the coordinates of any specific anatomic structure, are decided on the basis of the experience gained from employing a number of landmark configurations in order to choose one to provide optimum values for the coordinates of the anatomic sites or structures of interest. Specific examples will be indicated subsequently. At this point it should be noted that the lateral roentgenographic projection exhibits a number of extremely useful brain landmarks, e.g. the ventricular boundary contour of the posterior commissure and adjacent structures, etc. Internal bony landmarks of considerable utility are the contour of the base of the brain case and the posterior clinoid process.

Since interanatomic distances (landmark to landmark, landmark to chosen anatomic site) are not constant from one brain to another, optimum estimates of coordinate values for chosen sites are not realized without a method of scaling to take into account the different relative configuration characteristics of individual brains. We currently employ linear scaling methods in calculating values for the coordinates of anatomic sites of interest from measurements of the coordinate values of landmarks.

It will be understood that from the vertical and lateral roentgenograms obtained with the apparatus of this invention, and using published atlas information, it is possible to construct highly accurate sagittal maps.

At the present time two different methods of data handling are employed to determine for any specific subject animal the coordinates of chosen anatomic sites from the information summarized on a sagittal map and the data obtained from the lateral ventriculogram. In the first method the roentgenogram is optically projected at adjustable magnification onto a sagittal map. By adjustment of the magnification it is possible to bring into coincidence specific pairs of landmarks and to simultaneously satisfy certain specific criteria with respect to others, as will be illustrated below. When the criteria are satisfied, a mark, determined in position by projection of a chosen anatomic site appearing on the sagittal map, is placed on the lateral roentgenogram to designate the estimated projected position of the anatomic site in the subject animal. If electrode placement work is to be implemented immediately after ventriculography without removing the animal from the holder, then the coordinate values, longitudinal and vertical, of the position of this mark on the lateral roentgenogram are measured with respect to the rectilinear axes scribed on the roentgenogram. If electrode or other placement work is to be done later, when the animal is returned to the holder, then the position of the mark is transferred to the lateral skull roentgenogram taken at that time and the coordinate measurements are made. Simple arithmetic computation then yields the values to be set on a positioning system described hereinafter to place the penetrating electrode or other instrument at the desired site.

A second method of employing a saggital map and lateral roentgenographic information to obtain the longitudinal and vertical coordinates of specific anatomic sites involves the use of a computer. This latter procedure is particularly useful when the coordinate values of a large number of anatomic sites are to be determined. In this case the coordinates of specific point landmarks are measured from the lateral roentgenogram and these, together with sagittal map coordinates for these landmarks and for the anatomic sites of interest, are introduced into the computer. The computer code is formulated to employ linear scaling to take into account differences in landmark, landmark distances between sagittal map and brain of subject animals. A disadvantage of the present computer method is that the entire contour of a landmark is not utilized. However, future plans include the formulation of more sophisticated coding to permit the use of landmark contours.

It should be noted that the positions of the sites indicated in anatomic structures on the sagittal map are not simply the result of plotting atlas data; instead they represent the accumulation of experience resulting from the placement of lesions in the indicated anatomic structures in a number of brains by the method described here. In this sense the sagittal map undergoes continuing modification with improvement in the choice of site coordinates with respect to old or new landmark configurations.

The vertical roentgenogram provides the information needed to obtain the machine coordinate for each midsagittal position of the brain corresponding to the longitudinal coordinate value appropriate for each structure. At the present time, lateral values with respect to the midsagittal position are obtained directly from published atlases or from transverse tissue sections which are available, therefore, no lateral scaling is employed. In some cases the vertical roentgenogram also provides longitudinal coordinate values for certain landmarks.

Figure 2:
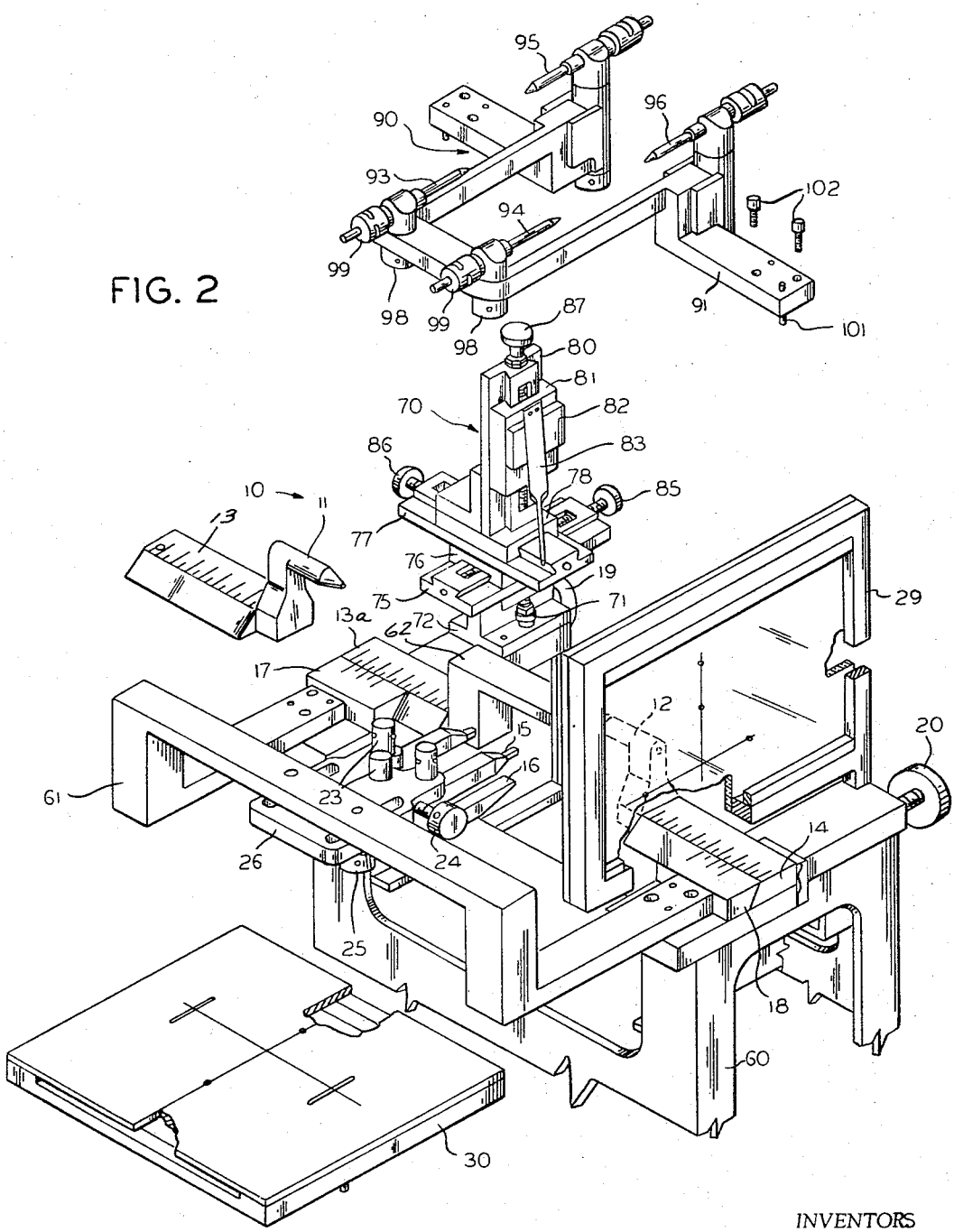
FIGURE 2 is a view similar to FIGURE 1 showing the benchmark fixture mounted and one ear bar demounted, and also showing an alternate head holder in a demounted position.

The head holder 10 (FIGURES 1-2) mounted on a rigid base structure 60 has a supporting member 61 to which the clamp support 26 is mounted. The position of the base 60 must be fixed in relation to the X-ray tubes used with the apparatus, so that the central axes of the tubes pass through the geometric center of the apparatus and the intersection of the axes of the cassettes. To facilitate such alignment, a bench mark fixture 62, supported from a slide 13a like the aforesaid slide 13, is mounted in position as shown in FIGURE 2, in place of the ear bar 11.

After such alignment, calibration marks on the slides 13, 13a and 14, and calibration marks on other parts of the apparatus accurately indicate the positions of the parts with respect to such axes.

A positioner 70 is mounted on the head holder 10 by fastening means 71 which pass through a base member 72. A horizontal position way 75 has a longitudinal axis which is traveled by a slide 76, whereon a horizontally position way 77, having a transverse axis, is mounted. A slide 78 which travels the transverse axis of the way 77, has mounted thereon a vertical way 80 which has cooperatingly connected thereto a slide 81, a support block 82 and holder 83. A plurality of adjusting screws 85, 86 and 87 are used to position the slides 76, 78 and 81 on the ways 75, 77 and 80, respectively.

The positioner 70, which is mounted on the head holder 10, can be employed to support a cannula for the ventriculography procedure, however, it is designed with the machine tool quality required to achieve the anatomic positioning accuracy for lesion production, or electrical stimulation and recording. The axes of the positioner 70 are aligned accurately parallel to those determined by the lead markers 41, 42, 43 and 44 of the cassette 29, and lead markers 51, 52, 54, and 55 of the cassette 30. Therefore, with the positioner 70, it is possible to position the tip of an electrode in deep brain at a geometric site determined from measurements made on the roentgenograms with an accuracy of 0.1 mm.

The tip of an electrode or probe may be brought into coincidence with the bench mark aperture 63 for alignment purposes and is an important step in achieving this accuracy. It will be appreciated that this coincidence procedure can be accomplished with considerably greater precision than the placement of the tip of an electrode or probe at the midpoint of the ear bar axis as defined by the blunt tipped ear bars 11 and 12 which engage the ear canals.

It should also be noted that with the X-ray tubes acting as point sources a finite distance away, a certain magnification takes place which must be taken into account in determining locations.

An alternate head support 90 shown demounted in FIGURE 2, has a frame 91 whereon a plurality of securing pins 93, 94, 95 and 96 are mounted. The securing pins 93, 94, 95 and 96 are radially and longitudinally adjustable by adjusting means 98 and 99. The frame 91 can be accurately located on the base structure 60 as shown in FIGURE 1, by a plurality of alignment pins 101 and secured thereby by a plurality of fasteners 102.

The alternate head support 90 is employed in supporting the head of an animal by means of the four securing pins 93, 94, 95 annd 96, which engage either appropriately made indentations in, or fixtures mounted on, the skull. This type of support method can be used in work on the human being as well as animals, and provides the advantage that procedures can be performed under local anesthesia without pain or discomfort to the human or animal.

When the alternate head support 90 is to be employed the animal, under general anesthesia, can be mounted in the head holder 10 first with the head supported by the ear bars 11 and 12 and skull and mouth clamps 15 and 16 whereupon the sites for engagement of the securing pins 93, 94, 95 and 96 can then be prepared. After the pins are in position the ear bars 11 and 12 and mouth clamps 15 and 16 can be removed and a local anesthetic agent infiltrated into the tissue at the sites of incisions to prevent discomfort when the animal is awake.

A tissue interface detector, shown in FIGURE 5, and usable with the instant invention, is generally designated by reference numeral 110 and will produce visual indication on a meter 112 when the tip of a cannula 113 passes from one tissue with specific electrical impedance values to another tissue with different values. An indicator 115, which consists of the meter 112 and an AC current source 116 is connected to the cannula 113 by a shield cable 118. The cannula 113 has an inner electrode 119 which has located thereabout insulation 120. The shield cable 118, inner electrode 119 and insulation 120 are made removable from the cannula 113 by means of a fitting 121.

In use, the cannula 113 is supported by the holder 83 and moved by the positioner 70, (FIGURE 1). The result of the impedance measurement is presented on a meter, with the deflection from a preset value proportional to magnitude of the impedance change. The deflection of the meter pointer, which occurs when the tip of the cannula 113 and the tip of the electrode 119 moves from subcortical white matter, corpus callosum or other similarly dense fiber tract region into the cerebrospinal fluid of the ventricular system, is a decrease of thirty to forty percent for an operation frequency of 2,000 cycles-per-second and for the size and configuration of the cannula 113 and inner electrode 119 used.

For ventriculography, the animals head is fixed in the head holder 10, as mentioned above, and under sterile conditions, the site of penetration of the cannula 113 is prepared by incising the scalp and making a small burr hole therein.

The position of the site of penetration of the cannula 113 can be decided with sufficient accuracy from external landmarks, for example, a chosen distance from an externally judged midsagittal plane and a chosen anterior-posterior coordinate position measured with respect to the external acoustic meatuses. After the tip of the cannula 113 and electrode 119 penetrate the cortex, the deflection of the meter 112 is adjusted to some convenient position, whereafter the cannula 113 is moved into the brain, and a change in meter deflection indicates ventricular penetration whereupon the inner electrode 119 is removed.

After one of the cassettes 29 or 30 is placed in position on the head holder 10 a syringe (not shown) containing an appropriate amount of X-ray opaque medium is slipped into the fitting on the end of the cannula 113 by means of the fitting 121 and the medium is injected at a rate to cause mixing with the cerebrospinal fluid. Excellent X-ray contrast is obtained on injection of 0.6 cm.$^3$ of the medium into a lateral ventricle of a cat. The axes employed in the measurement of the coordinate values of the landmarks are shown and the roentgenograms illustrate clearly the projected boundary configurations of the two lateral, third, and fourth ventricles. The aquaduct of Sylvius is clearly delineated. From such roentgenographic detail it is obviously possible to derive a considerable amount of landmark information.

It will be understood that modifications and variations may be made without departing from the spirit and scope of the novel concepts of this invention.

We claim as our invention:

1. In an apparatus for holding an animal's head and obtaining roentgenograms therefrom, rigid base means, alignment means including a benchmark which forms an imaginary geometric center in fixed relation to said base means, head holding means adjustably mounted on said base means for engaging the animal's head and fixing the position of selected points of the animal's head with respect to the imaginary geometric center, first and second cassette means fixedly mounted on said base for supporting film in first and second planes transverse to each other, and marker means on said cassette means in fixed relation to said geometric center for producing images on the film for location of coordinate axes.

2. In an apparatus for holding an animal's head and obtaining roentgenograms therefrom, rigid base means, alignment means including a benchmark which forms an imaginary geometric center in fixed relation to said base means, head holding means adjustably mounted on said base means for engaging the animal's head and fixing the position of selected points of the animal's head with respect to the imaginary geometric center, said head holding means comprising a pair of geometrically opposed ear bars on an axis extending through said geometric center and transverse to a first plane, and parallel to a second plane perpendicular to said first plane, said ear bars having ends for engagement in the animal's ears, and slides supporting said ear bars for movement on said axis and calibrated for fixing the position of said ends relative to said geometric center.

3. In an apparatus for holding an animal's head and obtaining roentgenograms therefrom, rigid base means, alignment means including a benchmark which forms an imaginary geometric center in fixed relation to said base means, head holding means adjustably mounted on said base means for engaging the animal's head and fixing the position of selected points of the animal's head with respect to the imaginary geometric center, and means for locating X-ray sources on axes extending through said geometric center and extending through the intersections of the coordinate axes defined by said benchmark.

4. In an apparatus for holding an animal's head and obtaining roentgenograms therefrom, rigid base means, alignment means including a benchmark which forms an imaginary geometric center in fixed relation to said base means, head holding means adjustably mounted on said base means for engaging the animal's head and fixing the position of selected points of the animal's head with respect to the imaginary geometric center, said head holding means comprising a frame fixed to said rigid base means, a first pair of pins mounted on said frame for adjustable movement toward the front portion of the animal's head, and a second pair of pins mounted on said frame for adjustable movement toward the rear portion of the animal's head.

5. In an apparatus for holding an animal's head and obtaining roentgenograms therefrom, rigid base means, alignment means including a benchmark which forms an imaginary geometric center in fixed relation to said base means, head holding means adjustably mounted on said base means for engaging the animal's head and fixing the position of selected points of the animal's head with respect to the imaginary geometric center, probe means, and means for supporting said probe means on said rigid base means for adjustable movement parallel to axes transverse to a pair of planes perpendicular to each other and through said geometric center to accurately position said probe means relative to the animal's head.

6. In an apparatus for holding an animal's head and obtaining roentgenograms therefrom, rigid base means, head holding means adjustably mounted on said base means for engaging the animal's head and fixing the position of selected points of the animal's head with respect to an imaginary geometric center in fixed relation to said rigid base means, probe means, means for supporting said probe means on said rigid base means for adjustable movement parallel to axes transverse to a pair of planes perpendicular to each other and through said geometric center to accurately position said probe means relative to the animal's head, said probe means comprising a cannula having an insulated inner electrode and adapted to be inserted into the animal's head, and means for measuring the electrical impedance between said inner electrode and said cannula.

7. In an apparatus for holding an animal's head and obtaining roentgenograms therefrom, rigid base means, head holding means adjustably mounted on said base means for engaging the animal's head and fixing the position of selected points of the animal's head with respect to an imaginary geometric center in fixed relation to said rigid base means, means including a benchmark which forms an imaginary geometric center in fixed relation to said beans for locating X-ray sources on axes extending through said geometric center and extending through the intersections of the coordinate axes defined by said benchmark.

8. In an apparatus for holding an animal's head and obtaining roentgenograms therefrom, rigid base means, alignment means including a benchmark which forms an imaginary geometric center in fixed relation to said base means, head holding means adjustably mounted on said base means for engaging the animal's head and fixing the position of selected points of the animal's head with respect to the imaginary geometric center, said head holding means comprising a pair of geometrically opposed ear bars on an axis extending through said geometric center and transverse to a first plane, and parallel to a second plane perpendicular to said first plane, said ear bars having ends for engagement in the animal's ears, and clamp means to engage the infraorbital ridges and upper teeth of the animal's head and cooperating with said ear bar means to secure the animal's head in the head holder.

9. An apparatus for holding the head of an animal in an exacting and unmovable position while obtaining lateral and vertical roentgenograms, said lateral and vertical roentgenograms being used for locating anatomic sites in the brain of said animal for insertion therein of probing means, comprising a first and second ear bar means mounted on a rigid base, said first and second ear bar means being transversely movable on said rigid base, first and second securing means for securing said first and second ear bar means after said first and second ear bar means have been placed into corresponding ear canals of said animal, first and second clamp means longitudinally and rotatably movable on said rigid base, third and fourth securing means for securing said first and second clamp means after said first and second clamp means have been placed onto the infraorbital ridges and mouth of said animal, lateral cassette means having located thereon coordinate axes, first alignment means for aligning said lateral cassette means on said rigid base, vertical cassette means having located thereon coordinate axis means, second alignment means for aligning said vertical cassette means on said rigid base means, a first probe positioning means mounted on said rigid base, said first positioning means being movable along an axis parallel to the longitudinal axis of said rigid base, a second probe positioning means mounted on said first positioning means, said second positioning means being movable along an axis parallel to the transverse axis of the rigid base, a third probe positioning means mounted on said second positioning means, said third positioning means being movable along an axis parallel to the vertical axis of said rigid base, holding means mounted on said third positioning means and movable along the longitudinal, transverse and vertical axes of said base by movement of said first, second and third positioning means, the axes of said first, second and third positioning means being accurately parallel to the coordinate axes means on said lateral and vertical cassettes, a cannula means for injecting an X-ray opaque medium into cerebrospinal fluid of said animal, and a detecting means to determine when said cannula means passes from the brain tissue into the ventricular system of said animal.

10. An apparatus for holding the head of an animal in an exacting and unmovable position while obtaining lateral and vertical roentgenograms, said lateral and vertical roentgenograms being used for locating anatomic sites in the brain of said animal for insertion therein of probing means, comprising a head holding means mounted on a rigid base, said head holding means having a plurality of pin means, a plurality of securing means to secure said plurality of pin means in a predetermined position when said pin means are engaged in indentations in or fixtures mounted on the skull of said animal, lateral cassette means having located thereon coordinate axes, first alignment means for aligning said lateral cassette means on said rigid base, vertical cassettte means having locating thereon coordinate axes, second alignment means for aligning said vertical cassette means on said rigid base, a first probe positioning means mounted on said rigid base, said first positioning means being movable along an axis parallel to the longitudinal axes of said rigid base, a second probe positioning means mounted on said first positioning means, said second positioning means being movable along an axis parallel to the transverse axes of said rigid base, a third probe positioning means mounted on said second positioning means, said third positioning means being movable along an axes parallel to the vertical axes of said rigid base, holding means mounted on said third positioning means and movable along the longitudinal, transverse and vertical axes of said rigid base by movement of said first, second and third positioning means, the axes of said first, second and third positioning means being accurately parallel to the coordinate axes on said lateral and vertical cassettes, a benchmark having alignment means thereon for alignment of said benchmark on said rigid base, said benchmark having indicating means which coincide with rectangular axes on said lateral cassette means, and a probing means movable along the longitudinal, transverse and vertical axes of said rigid base by first, second and third positioning means.

References Cited

UNITED STATES PATENTS

| | | | |
|---|---|---|---|
| 1,093,112 | 4/1914 | Clarke | 128—2 |
| 2,032,833 | 3/1936 | Broadbent | 250—50 |
| 2,111,903 | 3/1938 | Rona | 250—50 |
| 2,254,544 | 9/1941 | Plotz et al. | 250—50 |
| 3,064,641 | 11/1962 | Manenti et al. | 128—419 |
| 3,115,140 | 12/1963 | Volkman | 128—303.19 |
| 3,207,151 | 9/1965 | Takagi | 128—419 |
| 3,223,087 | 12/1965 | Vladyka | 128—303.13 |

RALPH G. NILSON, *Primary Examiner.*

A. L. BIRCH, *Assistant Examiner.*